May 30, 1944. A. B. RYPINSKI 2,350,195
CURRENT-LIMITING AND PROTECTIVE ARRANGEMENT
Filed Dec. 3, 1941 2 Sheets-Sheet 1
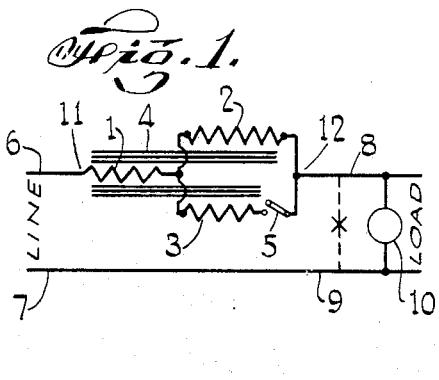
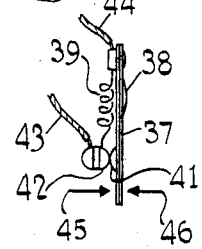
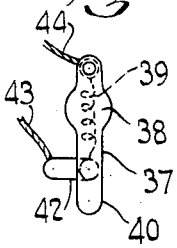
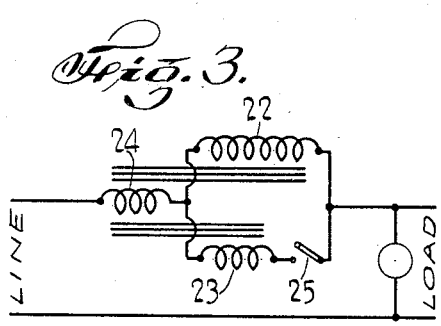
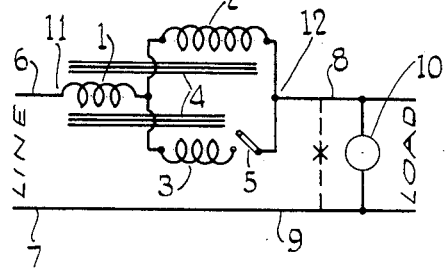
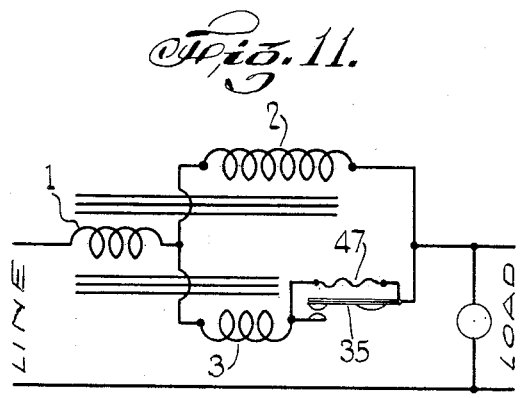
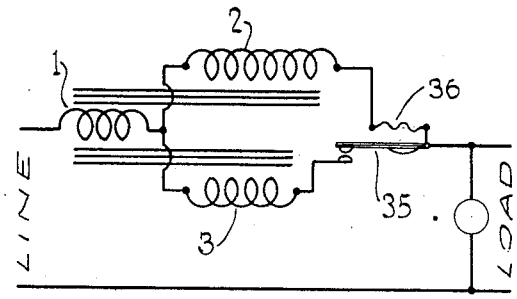
INVENTOR.
Albert B. Rypinski
BY
George F. Gill
ATTORNEY May 30, 1944.  A. B. RYPINSKI  2,350,195
CURRENT-LIMITING AND PROTECTIVE ARRANGEMENT
Filed Dec. 3, 1941  2 Sheets-Sheet 2
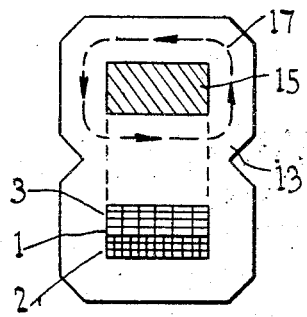
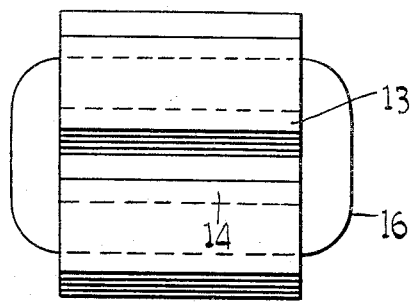
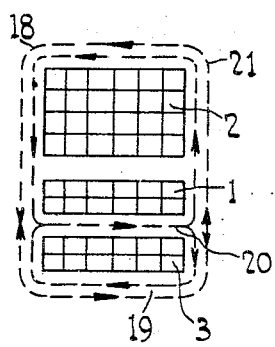
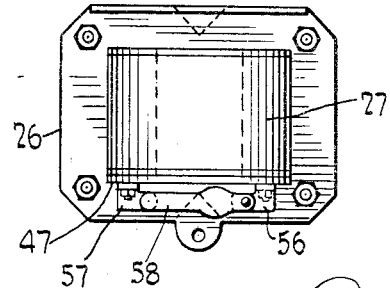
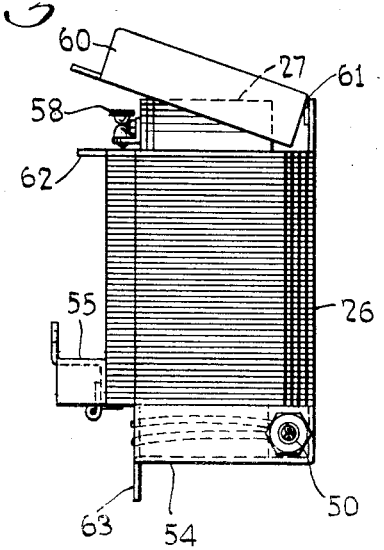
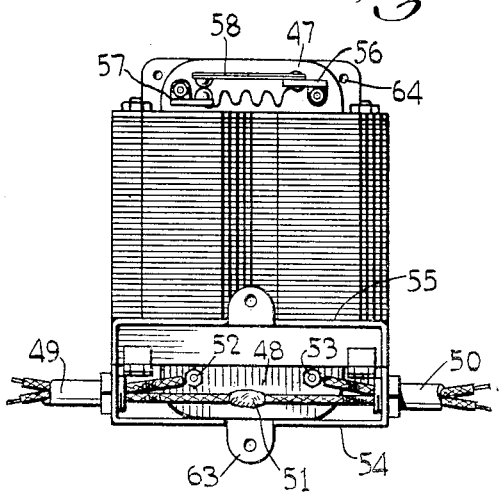
INVENTOR
Albert B. Rypinski
BY
George T. Gill
ATTORNEY Patented May 30, 1944

2,350,195

UNITED STATES PATENT OFFICE 2,350,195

CURRENT-LIMITING AND PROTECTIVE ARRANGEMENT

Albert B. Rypinski, Laurelton, Long Island, N. Y., assignor to Della C. Rypinski, Laurelton, Long Island, N. Y.

Application December 3, 1941, Serial No. 421,460

15 Claims. (Cl. 171—242)

The invention herein disclosed relates to a current limiting and protective arrangement or system for electrical circuits and comprehends a device suitable for interconnection in electrical circuits for effecting a current limiting and protective arrangement.

A current limiter or circuit protector should have the least possible voltage drop and watt loss for all current values including full load, and at a predetermined current value above full load it should alter its characteristics to attain a voltage drop, up to full line voltage, without allowing the current to exceed a safe value, except for a limited time. As an extreme requirement, and as an example, a current limiting and protective device should be comparable to a fuse. It has been established by the Fire Underwriters (report dated 1939 by Underwriters Laboratories Inc.), that a thirty ampere fuse consumes about three watts, a sixty ampere fuse about six watts and a one hundred ampere fuse about ten watts. The voltage drop across each is therefore approximately one-tenth of a volt at full load. In a current limiting device, the impedance drop may be higher, approximately two-tenths of a volt and meet the requirements. Where the device is to absorb full line voltage, for example, one hundred and twenty volts at no more than the full load current, the ratio of abnormal to normal voltage drop across the device is approximately six hundred to one.

By the invention herein disclosed, there is provided an automatically operative, current-limiting and circuit-protective arrangement and device which may be made to meet the foregoing requirements; which serves to limit the current, irrespective of the conditions existing in the protected circuit; which automatically provides an obstruction to the flow of an unsafe current upon the demand therefor in the protected circuit; which automatically restores a normal arrangement upon the cessation of the abnormal demand; and which, by suitable design, may reduce or eliminate the preliminary surge effective on short circuit that is so injurious to equipment connected in the circuit. In accordance with the invention, there is provided a coil including several windings inductively coupled and electrically interconnected so that under normal conditions the magnetic and electrical conditions are such that a negligible impedance is set up and there is a very low voltage drop across the coil. Included in the device there are means for disturbing the interaction of the windings upon the existence of abnormal current demand in the protected circuit such that the impedance may rise to obstruct the flow of currents above a safe value and to absorb the full line voltage if necessary, as in the case of a short circuit.

An arrangement and device embodying the invention are illustrated in the accompanying drawings and described in detail below. The arrangement or system is illustrated diagrammatically in the drawings and included in the illustration is the device diagrammatically represented. It is also disclosed as it may appear as an article of manufacture to be connected in to a circuit. The drawings include:

Fig. 1 which is a general diagrammatic representation of the arrangement;

Fig. 2 which is a diagrammatic representation of the arrangement with the windings related in a specific manner;

Fig. 3 which is a diagrammatic representation of the arrangement with the windings related in a specific manner different from that of Fig. 2;

Fig. 4 which is a longitudinal section, partially diagrammatic of the windings wound about a core and forming a coil;

Fig. 5 which is a transverse view, partially diagrammatic of the same;

Fig. 6 which is an elevation of the complete device adapted to be connected in circuit and effectuate the arrangement disclosed diagrammatically in the preceding figures;

Fig. 7 which is a front view with top cover removed, of the complete device shown in Fig. 6;

Fig. 8 which is a top view of Fig. 7 with the conduits and wiring omitted;

Fig. 9 which is a diagrammatic showing of part of Fig. 4;

Fig. 10 which is a diagrammatic representation of the windings with one alternative control arrangement;

Fig. 11 which is similar to Fig. 10 with a second alternative control arrangement;

Fig. 12 which is a side view of a particular form of contact arrangement; and

Fig. 13 which is a front view of the same.

The arrangement of this invention is disclosed, in general, in Fig. 1 of the drawings. In this figure of the drawings the protective device is represented as three windings, 1, 2 and 3 inductively coupled through a magnetically conductive core 4, and a switch 5 arranged in series with the winding 3 and representing a resistance, variable between a resistance of minimum or negligible ohmic value and one of maximum ohmic value. The supply or line is represented by the line wires 6 and 7 and the protected circuit is represented by the wires 8 and 9 across which the load 10, which may be lights, motors or any other form of electrical equipment, is connected. When connected in circuit, the protective device is interconnected to effectuate an arrangement in which the winding 1 is in series in the line and the windings 2 and 3 are parallelly arranged and thus connected in series with the winding 1, the winding 3 and switch 5 constituting a shunt for the winding 2 and the winding 2 constituting a shunt for the winding 3 and switch 5. In general, with switch 5 closed the entire current, passing to the protected circuit, must pass through winding 1 and in proportion to the relative obstruction or impedance will divide between windings 2 and 3. This represents the normal flow of current in the circuit as represented diagrammatically in Fig. 1.

The arrangement is such that upon an abnormal demand in the protected circuit including the wires 8, 9 and the load 10, the resistance represented by the switch 5, in the branch including the winding 3, varies. Means for effectuating such variations in an impedor for alternating current circuits are disclosed in Patents Nos. 1,972,112, 2,047,228, 2,068,712, 2,082,121, 2,082,122, 2,089,860, 2,093,368, 2,103,019, and 2,140,553 heretofore granted to me.

Under extreme conditions, as for example a short circuit across line wires 8 and 9 as represented at X, the protective device must limit the current flowing therethrough. In this connection the voltage drop across the device between the points 11 and 12 in Fig. 1 is the full line voltage. Depending upon the relative magnetic intercoupling of the coils, the voltage drop across the switch 5 under short circuit conditions, will be different. It is desirable particularly where an automatic switch is used for instantaneously increasing the resistance of winding 3 from a minimum to a maximum, that the voltage drop across the switch be as low as possible.

To this end, and to the end that the device, or windings of which it is made up, may, under normal conditions, have a voltage drop of the order, for example, of one-tenth volt, and, under full load conditions, have a voltage drop equivalent to full line voltage, the windings may be interconnected and magnetically coupled as represented in Fig. 2. Here windings 1 and 2 are wound and inductively coupled so as to assist or "boost" each other and the winding 3 is wound and inductively coupled so as to be opposed or "buck" windings 1 and 2. If, for example, the turns of windings 1 and 3 are equal, and the turns of winding 2 are twice that of either windings 1 and 3, with switch 5 closed and under normal conditions a very large percentage of the current will flow through windings 1 and 3 and switch 5, and the current in winding 2 will be very low, so low in fact that the magnetic effect of winding 2 is negligible. Under such conditions, the current passing through winding 1 is approximately equal to that passing through winding 3 and with windings 1 and 3 of an equal number of turns and opposed, the device as a whole is practically non-inductive and the impedance very low. In fact with careful design, the impedance, under the conditions described and at full load, may be such that the drop across the device is approximately one-tenth of a volt.

This condition maintains over a wide range of loads. As an illustration of the condition, an actual coil arrangement of this kind, on a relatively heavy core, was tested and the following table represents the current values in the paths at various loads:

| Coil No. 1 24 turns | Coil No. 2 48 turns | Coil No. 3 24 turns |
|---|---|---|
| Amperes | Amperes | Amperes |
| 5.0 | 0.40 | 4.+ |
| 10.0 | 0.43 | 9.+ |
| 20.0 | 0.47 | 19.+ |
| 30.0 | 0.50 | 29.+ |
| 40.0 | 0.60 | 39.+ |
| 80.0 | 1.20 | 78.+ |
| 120.0 | 1.75 | 118.+ |

It will be observed that the turn ratio of winding 2 to winding 3 is two to one, whereas at one hundred and twenty amperes total, the current ratio is approximately one to sixty-eight. Less than two percent of the total current of one hundred and twenty amperes passes through winding 2. This contrasts with the characteristic current split of the paralleled windings in my prior patents listed above, wherein the currents divided in inverse ratio of the paralleled turns, biased by the resistance of their respective paths.

The reason for the current distribution appears to be that there are two effects working against each other. The two windings 2 and 3 are in parallel, hence the total voltage drop across 2 must always equal that of 3, if switch 5 is negligible in resistance. But any magnetism threading both attempts to set up unequal voltage.

Assume perfect conditions for purposes of illustration, i. e., zero resistance all round and no leakage between windings. With any magnetism threading the windings we then have an impossible condition, i. e., equal voltages across 2 and 3 because they are in parallel, and at the same time unequal induced voltages because of the differing turns. It follows that the currents adjust themselves to produce zero magnetism. Still assuming perfect conditions, zero magnetism results with windings 1 and 3 carrying all the current, neutralizing each other magnetically, and winding 2 no current.

It is of course impossible to have zero resistance and no leakage, but not difficult to approximate these conditions.

Under the conditions enumerated, and assuming a short across the protected circuit as at X (Fig. 2), the voltage drop across the device becomes the full line voltage represented by V, that is, the voltage drop between the points 11 and 12 will be V. As windings 1 and 3 are opposed, the voltage drop across the switch 5 cannot exceed $V-V_1+V_3$, assuming $V_1$, the voltage induced in winding 1, is assisting, or in boosting relation to, the winding 2; and, therefore, for the relation mentioned, $V_3$, the voltage induced in winding 3, is opposed. If the windings 1 and 3 have equal turns, it will be apparent that the drop across the switch 5 will not exceed the line voltage. This contrasts with the condition in the prior patents listed, where with "bucking" windings the voltage across the resistor or switch 5 could exceed line voltage. It will thus be apparent that the winding 1 functions to reduce the drop across the switch 5 upon the existence of abnormal conditions.

The switch 5 may be one which automatically opens upon the passage of a specified current particularly where, for example, the arrangement is to be used for protecting a distribution circuit. For other purposes, such as a current-limiting arrangement for limiting the amount of current in a circuit, any form of resistor, particularly those in which the resistance changes in value on heating, as described in my aforementioned prior patents, may be used. Likewise, a combination of manually or automatically operative switch and variable resistance may be used in certain instances.

In any event, upon the existence of abnormal conditions, the resistance as represented by the switch 5 varies. With an automatically operated switch, the switch opens and immediately varies the resistance of the path including the winding 3 from a negligible ohmic value to a maximum ohmic value. Current thus ceases to flow through the winding 3 and its opposing effect is eliminated. The impedance of the device thus immediately varies from a very small impedance to maximum impedance as the windings 1 and 2 are now alone and in series and constitute a single reactance of full effectiveness.

It is to be noted that winding 1 is always in series with all load and that the switch 5 opens a shunt circuit, never the main line. This is important in considering how the instantaneous rush of energy into a short circuit is cut down to a safe value and the action effecting it.

Assume a short circuit across the load at X. The voltage across the impedor now equals the line voltage. As long as switch 5 is closed the controller tends to maintain its characteristic of zero magnetism in the core and zero current in the winding 2.

As switch 5 starts to open, the arc at its contacts starts to interrupt the flow of current in path 3—5. The main current is progressively transferred into path 2 in the short space of time between the parting of the contacts and the time the arc goes out.

While path 1—2 is a highly inductive one, at the instant of opening switch 5, there is no magnetism present, hence the total current is determined largely by the resistance of coils 1 and 2, both of which can be low, thus the current can be high. So the transfer of load from the path 3—5 to the path 2 can be accomplished with an arc at the switch 5 largely proportional to the relative resistances of the paths as the switch opens.

It is well known that there is a time lag in setting up magnetism in a core, and this phenomenon is effective in delaying the rise in magnetism threading windings 1 and 2 as switch 5 opens.

The sequence of operation, then, is (a) the switch opens, (b) the heavy load is transferred to the other path, and (c) subsequently the magnetism rises and checks the heavy current down to a safe value. It follows that the arc extinguishing duty of switch 5 is a lot less than it would be if it had to interrupt the total difference in current between full short circuit value and final safe value.

It is feasible, using the arrangement described, to meet the required change from normal to abnormal voltage drop in the ratio of one to six hundred. Such an arrangement will automatically absorb full line voltage under abnormal conditions, with resistance 5 a maximum, if there are sufficient turns provided in windings 1 and 2 for the particular iron core 4 used. For this purpose, it has been found advantageous to use an iron core of large cross section, thus reducing the turns of copper required and permitting the use of a heavy cross section of copper without heavy or expensive windings.

In Figs. 4 and 5 a characteristic and satisfactory arrangement is illustrated. The three windings are wound about the core so as to appear as a single coil having three windings. The core 13 may have a cross section, represented by the cross hatching 14, Fig. 5, at least four and preferably six or more times the cross section of the total copper of coils 1, 2 and 3, represented by the cross hatching 15, Fig. 4. At normal loads the iron is inactive and it makes no difference if there be little or much of it. But the more iron, the less turns of copper needed for "short circuit" operation. On the other hand, any reduction in the turns of copper and increase in their cross section cuts the voltage drop due to resistance (IR drop) at normal loads as well as the inductive action of the windings at normal loads. Windings 1 and 3 may be of relatively heavy cross section for the reasons stated, but winding 2 normally carries only a small current. For abnormal operation, with switch 5 open, winding 2 need carry only such current as the designer decides to be the proper amount, less or more than full load line current.

Where coils control very heavy currents under short circuit, as those described in my prior Patent No. 2,082,122 are called upon to do, the time element of operation becomes important. By suitably arranging the windings on the core, advantage may be taken of the practically instantaneous action of a coreless reactance for short circuit protection which may remain effective until the iron has time to act, and other actions become effective. With iron in the core, the time lag of the iron enters into the action and where an automatic switch is used, ten or fifteen cycles may occur before the switch opens. By arranging the windings as hereinafter described, the arrangement may be made to function differently under short circuit conditions during the first half cycle, than it does after the iron becomes effective.

One arrangement directed to this differential operation is shown in Figs. 4 and 5. Here a shell type core 13 carries the windings, denoted generally by the numeral 16. The "buck" winding 3 of Fig. 2 is nearest the center of the core, the "boost" winding 1 comes next and the greater turn "boost" winding 2 is farthest from the core center.

Under normal loads the windings are almost completely coupled because any magnetism present passes through the iron surrounding all three, as indicated by the arrow line 17, Fig. 4.

Under short circuit conditions there are two periods to be considered, one before and one after the iron is effective.

In the beginning of the first half cycle, when the short circuit is doing its greatest damage by straining equipment mechanically and altering the magnetization of generating equipment, the iron is not a factor, and leakage reactance between the windings, acting as a coreless reactance coil, determines, along with the IR drop, the impedance voltage the coil as a whole can absorb, and the current flow. Magnetic leakage between windings can operate in only one direction, i. e., to increase the impedance of the coil as a whole. Any magnetic flux which appears must, inevitably, by reason of the laws of self-induction, operate to set up self-induced voltages in such a direction as to oppose the line current's passage. The magnetic conditions are those shown in Fig. 9 which is an enlarged section of the windings at 15 of Fig. 4 with the spacings exaggerated. Windings 1 and 2 assist one another, with 3 opposed. There is therefore a flux represented by the arrow line 18 as a result of 1 and 2, and a separate flux 19 in the opposite direction as a result of 3. These two combine at 20.

Under short circuit conditions the currents in the various windings are many times full load. The line current is twenty times full load for a five percent reactor and thirty-three times for one of three percent reactance. Under these conditions of intensive magnetization the fluxes available, acting as in Fig. 9, are capable of producing a large impedance in the coil as a whole.

If we assume the iron not effective at all, the reluctance of all paths will be that through the air. Under the intensive magnetization of the short circuit current the three windings will act as three more or less independent coils, each with its own local flux as well as its flux combined with the others. There will be different densities of flux threading each winding. The controlling condition, as before, will be that windings 2 and 3 are in parallel and of different turns. The currents will adjust themselves in these paths so that the impedance voltages of 2 and 3 are equal. If the conditions were those of Fig. 2, i. e., twice as many turns in 2 as in 3, the flux threading 2 would need to be half that threading 3 if their resistances were equal.

Thus we see that if the iron is ineffective and the currents high it is to be expected that the coil as a whole will exhibit a considerable impedance due to self-induced voltages in the several windings. The high currents in the several windings will also produce a considerable IR drop which combined with the inductive drop will add up to line voltage with a limited current flow.

If now the iron becomes effective, the relative reluctances of the various paths are lowered. The flux densities rise in all parts of the magnetic circuits, and the line current falls to a lower value due to the increased reactance of the individual windings.

The circuit and generator protective devices may now come into action and remove the short. If they do the current drops back to normal, the leakage fluxes between windings fall to negligible values, and the coil becomes practically non-inductive.

If, however, the short persists, the control device shown as switch 5 in Fig. 2 may be caused to function and transfer part or all the load from winding 3 to winding 2, radically increasing the impedance of the coil and lowering the line current to a value considered safe by the designer.

From the above it will be seen that in the coil of my invention impedance appears at high currents due to leakage fluxes between windings. For current values where these leakage fluxes are small the coil will exhibit almost no change in inductive reactance with current changes. It differs in this respect from reactors of the air or iron core type wherein the reactance is a function of current and permeability.

While the combination of windings illustrated in Figs. 1 and 2 may be said to constitute the preferred form of the invention, other arrangements may serve in certain cases. In Fig. 3, for example, there is illustrated a similar arrangement having coils 22, 23 and 24 and a switch 25. In the arrangement of Fig. 3 all three windings assist each other. This arrangement is suitable for use where low loss and drop are not the prime requirements. Switch 25 in this combination has to break only the difference between the voltages of windings 22 and 23 and, therefore, considerably less than full line voltage. The current in path 23—25 may be more than full line current due to the circulating current set up by winding 22.

A device embodying the invention and which when connected in circuit effectuates the arrangement described above, is illustrated, partially diagrammatically in Figs. 6, 7 and 8. A core 26 carries three windings which collectively form the coil 27. The coil has suitable terminal boards 47 and 48 of strong electrical insulating material to which are fastened the winding terminals. Line wires are brought into the coil through conduit 49 and load wires taken out through conduit 50. The conduits terminate in a connection box 54 with hinged cover 55, shown in full open position. One wire from the line may be spliced to one wire leading to the load at 51. The other line wire may be connected to coil terminal 52 and the other load wire to coil terminal 53, both on the terminal board 48 previously described. This connection arranges the coil in series with the supply and load circuit.

On terminal board 47 are mounted fittings 56 and 57, and connected to the windings at the proper points through the terminal board. Fitting 56 carries bimetal 58 with its contact tip cooperating with a contact tip on fitting 57. If a heater is used it may be of the type indicated at 59 or any other suitable type. A cover 60, shown in Fig. 6 only, is hinged at 61, and when closed and fastened at 62 serves to completely enclose the top of the windings and all current carrying parts on the upper end of the coil. Cover 55 at the bottom, when closed and fastened at 63 serves to enclose all current carrying parts at the lower end of the coil. The iron core 26 need not be enclosed but if for appearance or other reason it is required to be, the whole device can be contained in a single metallic or other enclosure. Holes 64 provide means for fastening the device to a wall or other support.

The switching device of Figs. 6, 7 and 8 takes the form of a bimetallic element 58 that becomes heated, upon the passage therethrough of a current above a predetermined value, warps and releases a switch element that moves to open the circuit. It may operate slowly or with a snap action. Such switches are well known in the art. The bimetallic element may have a positive temperature coefficient of resistance, that is, upon heating its resistance may increase. Thus, it may be arranged such that for slight overloads, the resistances of the path containing the winding in series with the switch increases gradually at first and finally, upon continued or heavy overload, to a maximum by the opening of the switch.

I do not limit myself herein to any exact method of altering the resistance of the paths in the paralleled circuits to change the impedance of the coil.

I may employ a thermostat of the quick acting type to open one path as in Fig. 11. The construction of such thermostats is old and well understood. I may arrange an electrically heated element 47' to bias the operation of the thermostat. This also is an old expedient. I may connect the heating element 47' across the terminals of the thermostat 35 so that when it opens due to heat generated in itself by reason of the current flow through it, the thermostat will be held open by the heat from the adjacent heater winding. This heat will of course vary with the voltage across the thermostat and will permit reclosing at a critical value. Since the voltage across the thermostat 35 varies as the line current varies when the thermostat is open, a heater as just described can be arranged to maintain relatively high impedance in the coil until the line current falls to a predetermined value, after which it will allow the thermostat to close and lower the impedance radically.

Alternatively I may connect the heater in series with winding 2 of Fig. 2, for example, as shown in Fig. 10. With thermostat 35 open the total current in winding 2, which is the total line current under these conditions, flows through the heater 36. The heat produced in the heater and which acts to prevent the thermostat from closing is now proportional to the square of the line current. Because of this a relatively small change in line current can be made to allow the thermostat to close.

It is apparent that heat from any source can be utilized to cause the thermostat to function regardless of the current in the coil circuit. The heater need not be electrical, and if it is electrical can be energized from any external source.

I may provide mechanical means to cause the thermostat to snap open or closed. In Figs. 12 and 13 a thermostat arm 37 has a cupped portion 38 which imparts a snap action as it opens or closes under heating. This is well understood by those familiar with thermostats and is due to the unequal expansion and contraction of the two metals constituting the thermostat. The heater for keeping the contacts open once they part is shown at 39. Contacts 41—42 carry the current to wire 43, which with wire 44 provides for connection to the coil, not shown. End 40 of the thermostat is extended and arrows 45—46 represent any means mentioned below for mechanically moving the thermostat.

Such mechanical means may consist of pushbuttons for manual operation; of electromagnets or motors controlled from a remote point; of clock mechanism for operating the thermostat according to a time schedule; or of mechanism controlled by an electrical measuring device such as a wattmeter.

In each case the mechanical control may be superimposed on the current control of the coil itself. In other words the device may function automatically of itself to control the current in its circuit, but may in addition have features of control superimposed whereby it will also function under external control when there is no condition present in its circuit to make it function of itself.

To illustrate, consider the control as it would be if the mechanical movement at points 45—46 were under the control of a wattmeter in the same line that the coil itself is connected into. The coil itself will operate to raise or lower its impedance in accordance with line current. The wattmeter will operate to raise or lower the impedance of the coil in accordance with the watts of the circuit. It will therefore be both a current-limiter and a watt-limiter. Such a device could be made to take account of power factor of the load in the circuit it controlled. Whereas the current control would operate to protect apparatus the watt control would operate to limit the total energy supplied to the load.

From the foregoing description of the invention as embodied in the arrangements illustrated in the drawings, it will be seen that there is provided by this invention a simple, inexpensive and reliable current-limiting protective device and arrangement. The device is readily connected in circuit to effectuate the arrangement and may be made either to limit the current to a predetermined value or protect a circuit against overload and short circuit.

It will be obvious that various changes may be made by those skilled in the art in the details of the embodiments of the invention illustrated in the drawings and described in detail above within the principle and scope of the invention as expressed in the appended claims.

I claim:

1. A control arrangement of the kind described comprising in combination inductively coupled windings arranged such that substantially all flux threading one winding threads all windings and electrically interconnected to effectuate a minimum impedance under normal conditions and including two windings connected in series, and means for varying the electrical relation of the windings upon the flow of current in excess of a predetermined value.

2. A control arrangement of the kind described comprising in combination several and an odd number of windings inductively coupled such that substantially all flux threading one winding threads all windings and electrically interconnected to effectuate a minimum impedance under current conditions below a predetermined value, and means for varying the electrical relations of the windings to effectuate an increase in impedance upon the flow of current in excess of the predetermined value.

3. A control arrangement of the kind described comprising in combination several and an odd number of windings inductively coupled such that substantially all flux threading one winding threads all windings and electrically interconnected in series parallel relation, and current responsive means for increasing the resistance to the flow of current through one of the windings.

4. A control arrangement of the kind described comprising in combination a plurality of inductively coupled and electrically interconnected windings arranged such that substantially all flux threading one winding threads all windings and including one winding having a greater number of turns than any of the others, and means for increasing the resistance to the flow of current through one of the windings.

5. A control arrangement of the kind described comprising in combination at least three closely coupled and interconnected windings arranged such that substantially all flux threading one winding threads all windings, the turns and relative polarities of the windings being arranged to reduce the current in at least one winding to a minimum, the arrangement being characterized by the fact that there is substantially no magnetism below a predetermined current value.

6. A control arrangement of the kind described comprising in combination at least three closely coupled and interconnected windings arranged such that substantially all flux threading one winding threads all windings, one of the windings being of a different number of turns than another and connected in parallel therewith, and the turns and relative polarities of the windings being arranged to reduce the current in at least one of the windings to a minimum, the arrangement being characterized by the fact that there is substantially no magnetism below a predetermined current value.

7. A control arrangement of the kind described comprising in combination three closely coupled and interconnected windings arranged such that substantially all flux threading one winding threads all windings and including two windings of a different number of turns connected in parallel and the third winding connected in series therewith, the turns and relative polarities of the windings being arranged to reduce the current in one of the windings to a minimum, the arrangement being characterized by the fact that there is substantially no magnetism below a predetermined current value.

8. A control arrangement of the kind described comprising in combination three closely coupled and interconnected windings arranged such that substantially all flux threading one winding threads all windings and including two windings of an equal number of turns connected in series and a third winding of a different number of turns connected in parallel with only one of the other windings.

9. A control arrangement of the kind described comprising in combination three closely coupled and interconnected windings arranged such that substantially all flux threading one winding threads all windings and including two windings of an equal number of turns connected in series and a third winding of a different number of turns connected in parallel with only one of the other windings, the two windings of an equal number of turns being wound and arranged to oppose each other, whereby the current in the winding of the different number of turns is maintained at a minimum.

10. A control arrangement of the kind described comprising in combination three closely coupled and interconnected windings arranged such that substantially all flux threading one winding threads all windings and including two windings of an equal number of turns connected in series and a third winding of a different number of turns connected in parallel with only one of said windings of an equal number of turns, and means for varying the resistance of the path containing the winding connected in parallel with said winding of a different number of turns.

11. A control arrangement of the kind described comprising in combination three closely coupled and interconnected windings arranged such that substantially all flux threading one winding threads all windings and including two windings of an equal number of turns connected in series and a third winding of a different number of turns connected in parallel with only one of the other windings, the two windings of an equal number of turns being wound and arranged to oppose each other, whereby the current in the winding of the different number of turns is maintained at a minimum for current values below a predetermined current value, and means for varying the resistance of the path containing the winding connected in parallel with said winding of a different number of turns.

12. A control arrangement of the kind described comprising in combination a coil including three windings wound upon a single core arranged such that substantially all flux threading one winding threads all windings, two of said windings having an equal number of turns and being connected in series and the third winding having a different number of turns and connected in parallel with only one of the other windings, and means for varying the resistance of the path containing the winding connected in parallel with the third winding.

13. A control arrangement of the kind described comprising in combination a coil including three windings wound upon a single core arranged such that substantially all flux threading one winding threads all windings, two of said windings having an equal number of turns and being connected in series and the third winding having a different number of turns and connected in parallel with only one of the other windings, the two windings of an equal number of turns being wound and arranged to oppose each other, whereby the current in the winding of the different number of turns is maintained at a minimum for current below a predetermined current value, and means including a switch for varying the resistance of the path containing the winding connected in parallel with said winding of a different number of turns.

14. A control arrangement of the kind described comprising in combination a base of electrical insulating material, a coil mounted on the base including three windings arranged such that substantially all flux threading one winding threads all windings, two of said windings having an equal number of turns and being connected in series and the third winding having a different number of turns and connected in parallel with only one of the other windings, the two windings of an equal number of turns being wound and arranged to oppose each other, and means including a circuit interrupter mounted on the base for varying the resistance of the path containing the winding connected in parallel with said winding of a different number of turns.

15. A control arrangement of the kind described comprising in combination three closely coupled and interconnected windings arranged such that substantially all flux threading one winding threads all windings and including two windings of an equal number of turns connected in series and a third winding of a greater number of turns connected in parallel with only one of the other windings, the two windings of an equal number of turns being arranged to oppose each other.

ALBERT B. RYPINSKI.